(12) United States Patent
Heims et al.

(10) Patent No.: US 9,982,601 B2
(45) Date of Patent: May 29, 2018

(54) OIL SYSTEM WITH HELMHOLTZ RESONATOR DAMPER IN LUBE LINE

(71) Applicant: United Technologies Corporation, Hartford, CT (US)

(72) Inventors: Eric J. Heims, Avon, CT (US); Andre Herman Troughton, Windsor, CT (US); Ryan K. Snyder, Glastonbury, CT (US); Jeffrey Honan, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 329 days.

(21) Appl. No.: 14/726,993

(22) Filed: Jun. 1, 2015

(65) Prior Publication Data

US 2016/0348582 A1 Dec. 1, 2016

(51) Int. Cl.
*F02G 3/00* (2006.01)
*F02C 7/06* (2006.01)
(Continued)

(52) U.S. Cl.
CPC .............. *F02C 7/06* (2013.01); *F01D 25/18* (2013.01); *F01D 25/20* (2013.01); *F01M 1/02* (2013.01);
(Continued)

(58) Field of Classification Search
CPC .......... F01D 25/18; F01M 11/02; F01M 1/02; F01M 1/16; F01M 5/002; F02C 7/06; F05D 2220/32; F05D 2260/98
See application file for complete search history.

(56) References Cited

U.S. PATENT DOCUMENTS 4,178,965 A * 12/1979 Zahid .................... F16L 55/053
138/26
4,473,043 A 9/1984 Furukawa et al.
(Continued)

FOREIGN PATENT DOCUMENTS

| EP | 2103794 | 9/2009 | |
|---|---|---|---|
| GB | 996841 A * | 6/1965 | .......... F04B 11/0016 |
| RU | 2035597 | 5/1995 | |

OTHER PUBLICATIONS

Extended European Search Report dated Oct. 4, 2016 in European Application No. 16172272.3.

*Primary Examiner* — Jesse Bogue
(74) *Attorney, Agent, or Firm* — Snell & Wilmer L.L.P.

(57) ABSTRACT

An oil lubrication system is provided. The oil lubrication system may comprise an oil pump, a conduit fluidly coupled to the oil pump, and a damper fluidly coupled to the conduit. The damper may further comprise a volume configured to receive oil in response to a pulse event. A heat exchanger may also be fluidly coupled to the conduit. In various embodiments, the damper may comprise a spherical volume. The damper may be fluidly coupled to the conduit between the oil pump and the heat exchanger. An adapter may be mechanically coupled between the conduit and the damper. The adapter may comprise a passage in fluid communication with the conduit and the damper. The damper may further comprise a membrane. A gas or compressible fluid may be disposed in the damper on a first side of the membrane. The membrane may be configured to separate the gas from the oil.

20 Claims, 6 Drawing Sheets

(51) Int. Cl.

| | |
|---|---|
| *F01M 1/02* | (2006.01) |
| *F01M 1/16* | (2006.01) |
| *F01M 5/00* | (2006.01) |
| *F01D 25/18* | (2006.01) |
| *F01M 11/02* | (2006.01) |
| *F01D 25/20* | (2006.01) |

(52) U.S. Cl.
CPC ............. *F01M 1/16* (2013.01); *F01M 5/002* (2013.01); *F01M 11/02* (2013.01); *F05D 2220/32* (2013.01); *F05D 2260/98* (2013.01)

(56) References Cited

U.S. PATENT DOCUMENTS

| | | | |
|---|---|---|---|
| 4,947,639 A * | 8/1990 | Hibner | F01D 25/164 384/535 |
| 5,868,168 A * | 2/1999 | Mott | F16L 55/053 138/26 |
| 9,046,001 B2 * | 6/2015 | Hindle | F01D 25/164 |
| 2006/0243335 A1 | 11/2006 | Krieger et al. | |
| 2008/0128210 A1 | 6/2008 | Lieske et al. | |
| 2008/0202574 A1 * | 8/2008 | Milano | E04H 15/44 135/121 |
| 2016/0333736 A1 * | 11/2016 | Parnin | F16F 15/0237 |

* cited by examiner

OIL SYSTEM WITH HELMHOLTZ RESONATOR DAMPER IN LUBE LINE

FIELD OF INVENTION

The present disclosure relates to gas turbine engines, and, more specifically, to damping oil systems for gas turbine engines.

BACKGROUND

Gas turbine engines may include oil systems to lubricate moving parts. The oil systems may include oil coolers, oil pumps, and conduits to cool and transport the oil throughout the gas turbine engine. Some oil pumps may produce standing pressure pulses. The pressure pulses may be particularly large when the oil pump speed is in mode with the engine core speed. Some oil system components may be sensitive to uneven pressures and/or pressure pulses. For example, a heat exchanger may have numerous welds that are sensitive to varying pressures and may be damaged by the same. The pressure pulses may thus result in oil system failure by damaging oil system components.

SUMMARY

An oil lubrication system may comprise an oil pump, a conduit fluidly coupled to the oil pump, and a damper fluidly coupled to the conduit. The damper may further comprise a volume configured to receive oil in response to a pulse event. A heat exchanger may also be fluidly coupled to the conduit.

In various embodiments, the damper may comprise a spherical volume. The damper may be fluidly coupled to the conduit between the oil pump and the heat exchanger. An adapter may be mechanically coupled between the conduit and the damper. The adapter may comprise a passage in fluid communication with the conduit and the damper. The damper may further comprise a membrane. A gas may be disposed in the damper on a first side of the membrane. The membrane may be configured to separate the gas from the oil.

An oil system on a gas turbine engine may comprise a power generator, a conduit fluidly coupled to the power generator, and an oil pump fluidly coupled to the conduit. The oil pump may be configured to pressurize oil. A damper may be fluidly coupled to the conduit. The damper may comprise a first volume configured to receive the oil in response to a pulse event. An oil component may be fluidly coupled to the conduit downstream from the damper. The damper may have a spherical volume. The damper may also be fluidly coupled to the conduit between the oil pump and the oil component. An adapter may be mechanically coupled between the conduit and the damper. The adapter may comprise a passage in fluid communication with the conduit and the damper. The damper may comprise a membrane. The damper may comprise a gas disposed in the damper on a first side of the membrane. The membrane may be configured to separate the gas from the oil.

A gas turbine engine may comprise a compressor, a combustor aft of the compressor and in fluid communication with the compressor, a turbine in fluid communication with the combustor, and a lubrication system coupled to the gas turbine engine. The lubrication system may comprise an oil pump, a conduit fluidly coupled to the oil pump, and a damper fluidly coupled to the conduit. The damper may comprise a volume configured to receive oil in response to a pulse event. A heat exchanger may also be fluidly coupled to the conduit.

In various embodiments, the damper may be fluidly coupled to the conduit between the oil pump and the heat exchanger. An adapter may be mechanically coupled between the conduit and the damper. The adapter may also define a passage between the damper and the conduit. The damper may include a membrane configured to separate a gas from the oil.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
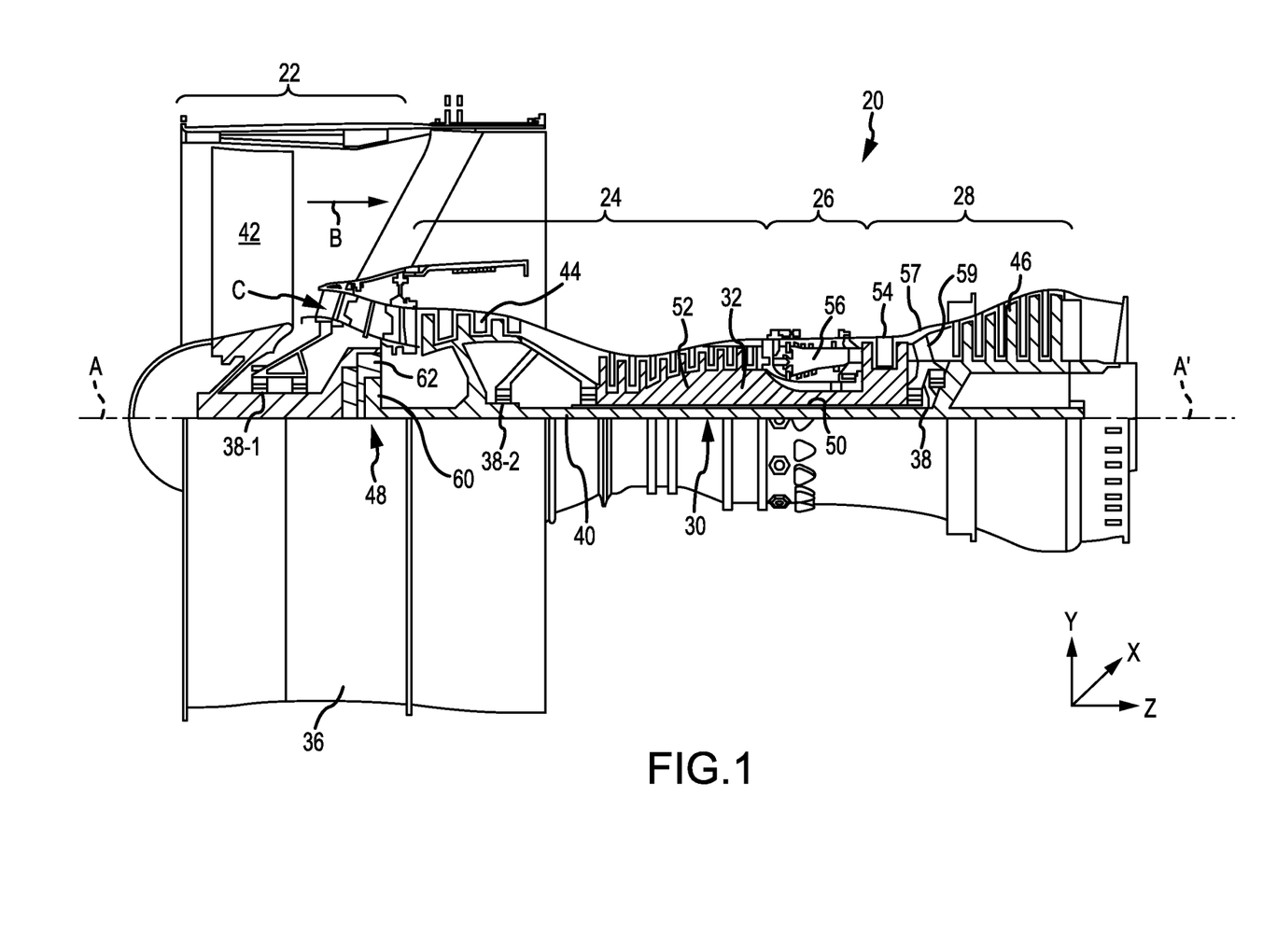
FIG. 1 illustrates an exemplary gas-turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure (or first) compressor section 44 and a low-pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. Gear assembly 60 may rely on lubrication and have stringent pressure requirements. Similarly, an engine sub system such as a power generator may use an oil lubrication system to lubricate and cool moving components.

High speed spool 32 may comprise an outer shaft 50 that interconnects a high-pressure (or second) compressor 52 and high-pressure (or second) turbine 54. A combustor 56 may be located between high-pressure compressor 52 and high-pressure turbine 54. A mid-turbine frame 57 of engine static structure 36 may be located generally between high-pressure turbine 54 and low-pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow C may be compressed by low-pressure compressor section 44 then high-pressure compressor 52, mixed and burned with fuel in combustor 56, then expanded over high-pressure turbine 54 and low-pressure turbine 46. Turbines 46, 54 rotationally drive the respective low speed spool 30 and high speed spool 32 in response to the expansion. It should be understood, however, that the above parameters are exemplary of various embodiments of a geared architecture engine and that the present disclosure contemplates other turbine engines including direct drive turbofans, power generators, or any engine or engine sub system that uses oil lubrication.

Figure 2:
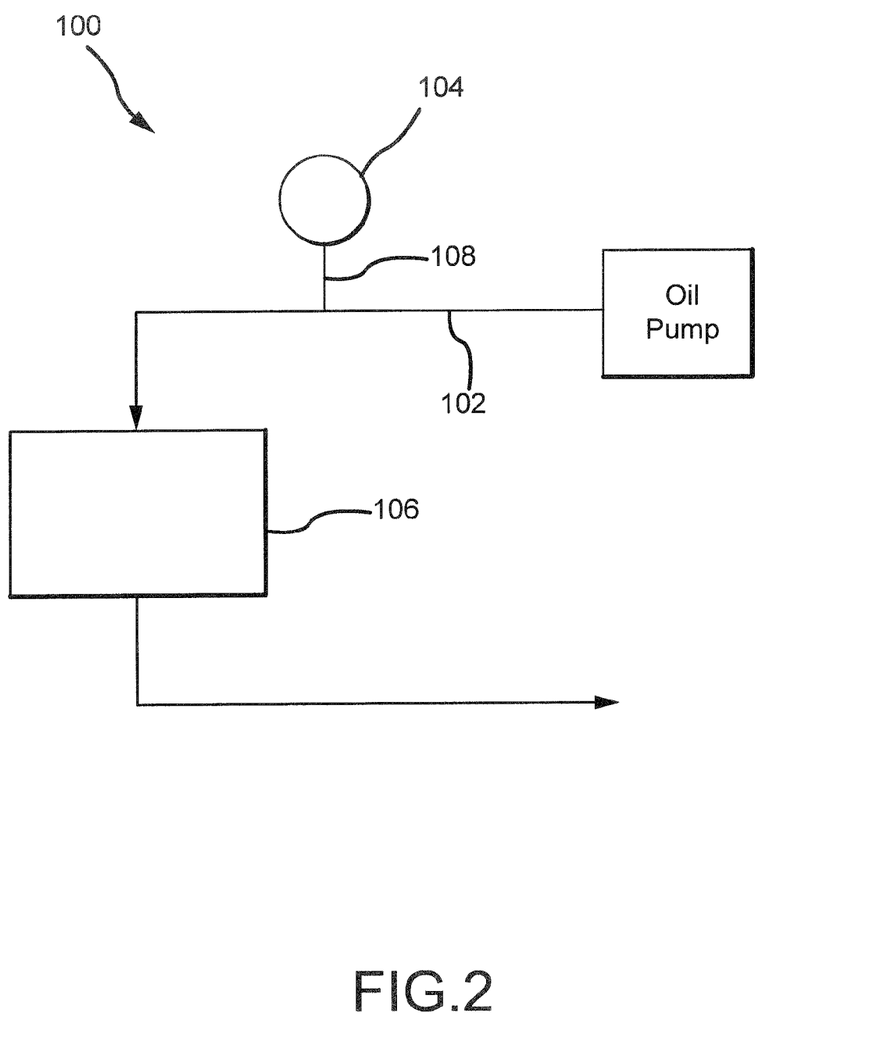
FIG. 2 illustrates a schematic diagram of an oil lubrication system having a damping device, in accordance with various embodiments.

With reference to FIG. 2, a schematic diagram of a portion of an oil lubrication system 100 is shown, in accordance with various embodiments. Oil lubrication system comprises conduit 102. Conduit 102 may be tubing formed from a material suitable to carry oil, such as stainless steel. Conduit 102 may be in fluid communication with damper 104 and oil component 106 with damper 104 fluidly coupled to an inlet side of oil component 106. Oil component 106 may be an oil-air heat exchanger, an oil-oil heat exchanger, an oil pump, a filter, or any other component of an oil system. Oil may pass from an oil pump through conduit 102 into oil component 106. Conduit 102 may be in fluid communication with damper 104 through adapter 108. In that regard, adapter 108 may define a passage for oil to pass into and out of damper 104.

Figure 3:
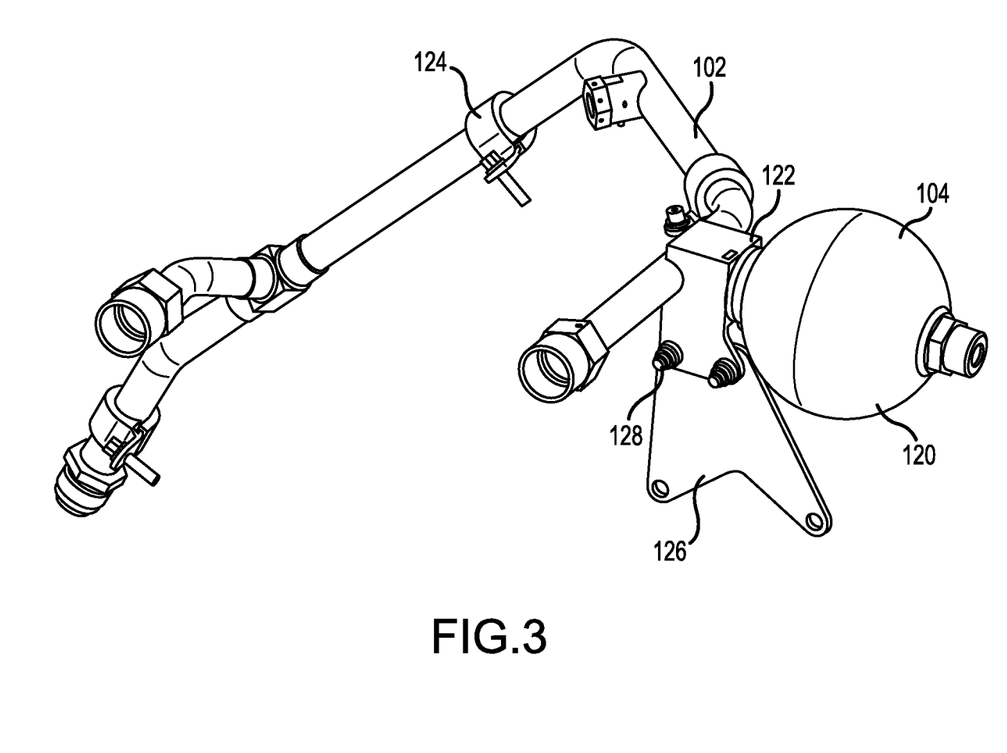
FIG. 3 illustrates an oil conduit in fluid communication with a damper, in accordance with various embodiments.

With reference to FIG. 3, a conduit 102 and damper 104 are shown mechanically coupled together by adapter 122. Damper 104 may comprise housing 120. Housing 120 is depicted as having a spherical geometry but, in various embodiments, damper 104 may have other geometries such as cubic, rectangular, pyramid, conical, cylindrical, or other suitable geometries for providing a volume in which oil is able to expand. Oil may move from conduit 102, through adapter 122, and into damper 104 in response to a pressure pulse exerted on the oil. Damper may be formed using a rigid material such as aluminum, stainless steel, other metals, thermoplastics, or other suitable rigid material. Damper 104 may be coupled to adapter 122 by mechanical attachment, such as threads or permanent attachment methods for metallic materials such as welding for damper 104. Adapter 122 may further be welded to conduit 102 with a passage of adapter 122 in fluid communication with the volume defined by conduit 102.

In various embodiments, mounting brackets 124 may provide a mounting point to secure conduit 102 in an engine compartment or otherwise fixedly couple conduit 102 in a desired location. Mounting bracket 126 may be coupled to adapter 122 using fasteners 128. In that regard, mounting bracket 126 may mechanically couple adapter 122 and damper 104 to a desired mounting location.

Figure 4:
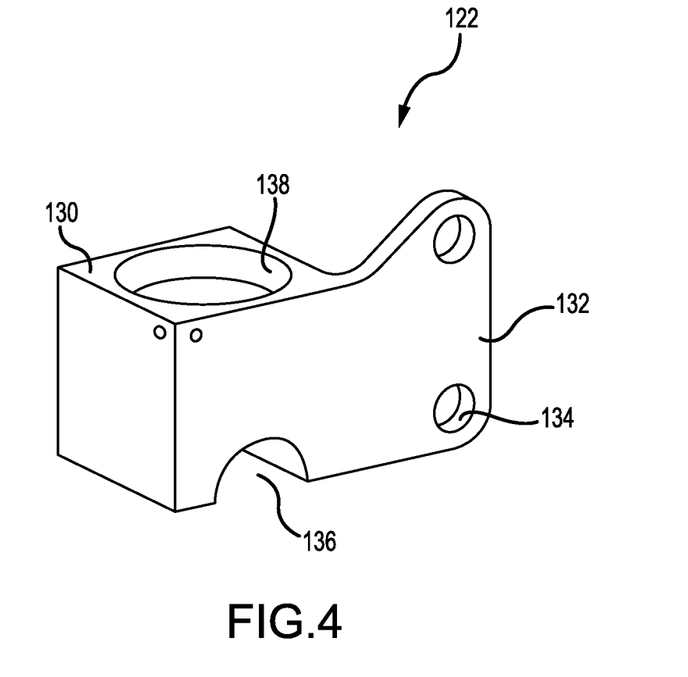
FIG. 4 illustrates an adapter for coupling a damper to an oil conduit, in accordance with various embodiments.

With reference to FIGS. 3 and 4, adapter 122 is shown having mounting structures 134, passage 138, and recess 136, in accordance with various embodiments. Mounting structures 134 may be openings configured to receive fasteners and couple adapter 122 to a mounting bracket or mounting location (e.g., fasteners 128 and mounting bracket 126). Mounting structures 134 may be defined by mounting appendage 132.

In various embodiments, adapter 122 may comprise a body 130 defining passage 138. Passage 138 may be configured to fluidly couple a damper 104 and conduit 102. Passage 138 may open into recess 136. Recess 136 may be a cylindrical recess mirroring the contour of conduit 102. Conduit 102 may fit partially within recess 136. An opening may be formed in a surface of conduit 102 and aligned with passage 138. Adapter 122 may be welded or otherwise fixed to conduit 102 with conduit 102 disposed partially in recess 136.

In various embodiments, damper 104 may comprise a single opening in fluid communication with passage 138 and conduit 102. Damper 104 may be fixed to adapter 122 with damper 104 on a first side of adapter 122 and conduit 102 on a second side of adapter 122. The first side of adapter 122 and the second side of adapter 122 may be opposite one another or at a specific angle less than 180 degrees.

Figure 5:
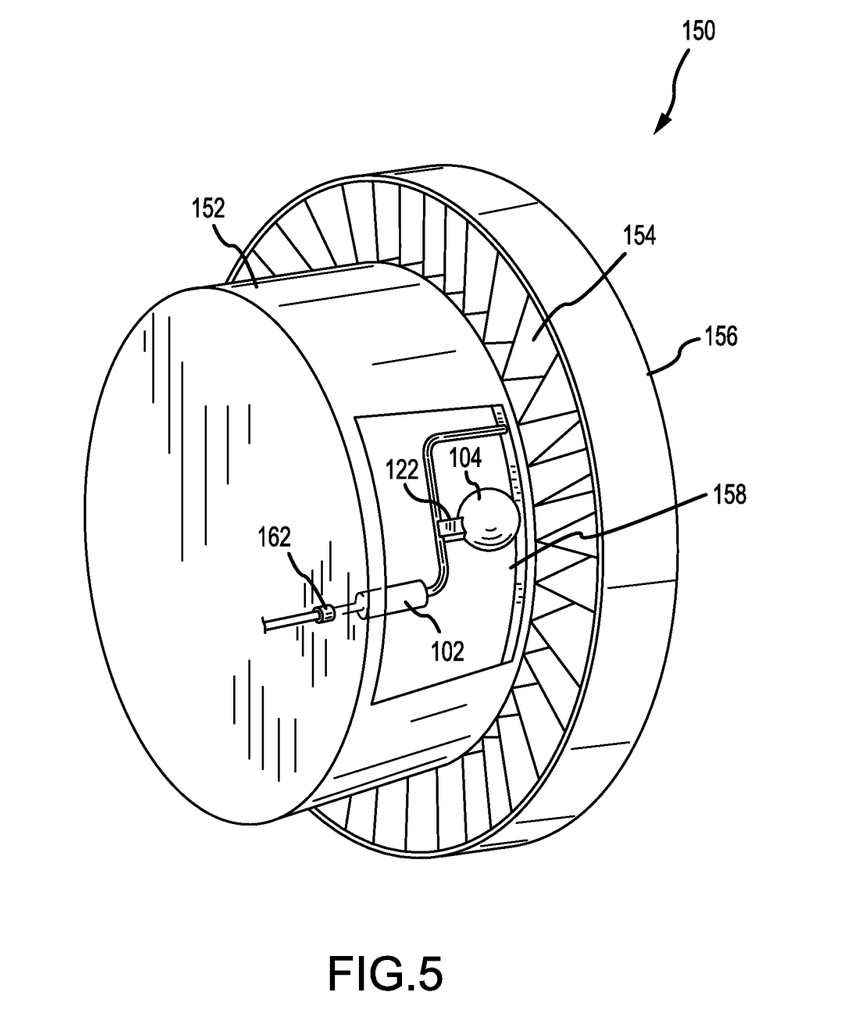
FIG. 5 illustrates an oil conduit and damper mounted to a gas turbine engine, in accordance with embodiments.

With reference to FIG. 5, fan section 150 of a gas-turbine engine is shown with conduit 102 mounted to an engine, in accordance with various embodiments. Although conduit 102 is shown in a single location, conduit 102 may be located at any point in the oil system. Fan section 150 may include housing 152 aft of fan 154 and shroud 156. Conduit 102 may be disposed in compartment 158 of housing 152. Compartment 158 may be readily accessible by removing a single panel or multiple panels, for example. Panels may be used to provide easy access for maintenance or repair of conduit 102, adapter 122, or damper 104. Conduit 102 may couple with oil-supply line by interface 162 and conduit 102. Conduit 102, adapter 122, and damper 104 may be fixed in place during normal operation and flight of an aircraft to provide damping for an oil system.

Figure 6:
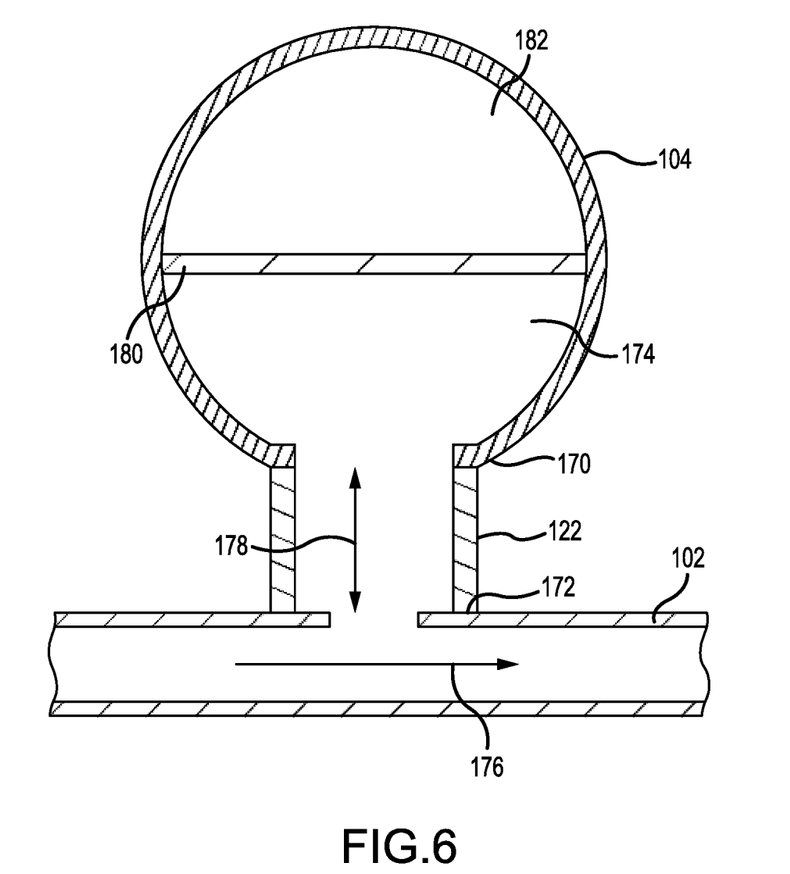
FIG. 6 illustrates a cross sectional view of a damper, an adapter, and a conduit operating in response to a pressure pulse, in accordance with various embodiments.

With reference to FIG. 6, a cross-sectional view of damper 104 and adapter 122, in accordance with various embodiments. Weld 172 may join conduit 102 and adapter 122. Similarly, weld 170 may join damper 104 and adapter 122. Damper 104 may mechanically fasten to adapter 122. Adapter 122 may thus fluidly couple conduit 102 and damper 104 by defining a passage between conduit 102 and damper 104. In response to a pulse event, oil 176 may move through conduit 102 with increased pressure. Oil may move into damper 104 in response to the increased pressure. A pulse event may be caused by an oil pump operating in mode with engine speed, for example.

In various embodiments, damper 104 may comprise volume 174 to receive oil 178 moving into damper 104. Damper 104 may optionally comprise a membrane 180 to separate volume 174 from volume 182. The membrane 180 may separate damper 104 having spherical geometry into two hemispherical volumes (i.e., volume 174 and volume 182). Volume 174 may be open to adapter 122. Volume 182 may be filled with an inert gas, nitrogen, air, or other gas to provide loading in damper 104. Volume 182 may be filled with a compressible fluid.

In various embodiments, gas in volume 182 may compress in response to oil entering volume 174 of damper 104 to enable damper 104 to receive oil in response to a pressure pulse. As gas or compressible fluid in volume 182 compresses, membrane 180 may depress into volume 182, thereby increasing volume 174. After the pulse event, volume 182 may expand and urge oil 178 out damper 104 and through adapter 122. Damper 104 may thus reduce the pressure jump experienced in nearby areas of the oil system by providing an expansion area for pressurized oil. Oil 176 may then enter an oil component such as a heat exchanger with a normalized pressure.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An oil lubrication system, comprising:
    a conduit;
    a damper fluidly coupled to the conduit, wherein the damper comprises a volume configured to receive oil in response to a pulse event;
    an adapter mechanically coupling the conduit and the damper, the adapter comprising: a first mounting structure having a mounting recess conforming to a negative defined by an outer surface of the conduit, a second mounting structure comprising an annulus configured to receive the damper, and a mounting appendage; and
    a heat exchanger fluidly coupled to the conduit.

2. The oil lubrication system of claim 1, wherein the mounting appendage further comprises a third mounting structure coupled to a mounting bracket.

3. The oil lubrication system of claim 1, wherein the volume is spherical.

4. The oil lubrication system of claim 1, wherein the damper is fluidly coupled to the conduit on an inlet side of an oil component.

5. The oil lubrication system of claim 1, wherein the adapter comprises a passage in fluid communication with the conduit and the damper between the first mounting structure and the second mounting structure.

6. The oil lubrication system of claim 5, wherein the damper comprises a first threaded connection and a membrane that divides the volume into a first subvolume and a second subvolume, wherein the annulus of the adapter further comprises a second threaded connection.

7. The oil lubrication system of claim 6, wherein the damper comprises at least one of a gas or a compressible fluid disposed in the first subvolume.

8. The oil lubrication system of claim 7, wherein the membrane is configured to flex in response to pressure.

9. An oil system on a gas turbine engine, comprising:
a conduit;
an oil pump fluidly coupled to the conduit;
a damper fluidly coupled to the conduit, wherein the damper comprises a first volume configured to receive oil in response to a pulse event;
an adapter mechanically coupling the conduit and the damper, the adapter comprising: a first mounting structure having a mounting recess conforming to a negative defined by an outer surface of the conduit, a second mounting structure comprising an annulus configured to receive the damper, and a mounting appendage; and
an oil component fluidly coupled to the conduit downstream from the damper.

10. The oil lubrication system of claim 9, wherein the mounting appendage further comprises a third mounting structure coupled to a mounting bracket.

11. The oil system of claim 9, wherein the first volume is spherical.

12. The oil system of claim 9, wherein the damper is fluidly coupled to the conduit on an inlet side of the oil component.

13. The oil system of claim 9, wherein the adapter comprises a passage in fluid communication with the conduit and the damper between the first mounting structure and the second mounting structure.

14. The oil system of claim 13, wherein the damper comprises a first threaded connection and a membrane that divides the volume into a first subvolume and a second subvolume, wherein the annulus of the adapter further comprises a second threaded connection.

15. The oil system of claim 14, wherein the damper comprises at least one of a gas or a compressible fluid disposed in the first subvolume.

16. The oil system of claim 15, wherein the membrane is configured to flex in response to pressure.

17. A gas turbine engine, comprising:
a compressor;
a combustor aft of the compressor and in fluid communication with the compressor;
a turbine in fluid communication with the combustor; and
a lubrication system coupled to the gas turbine engine, comprising:
an oil pump,
a conduit fluidly coupled to the oil pump,
a damper fluidly coupled to the conduit, wherein the damper comprises a volume configured to receive oil in response to a pulse event,
an adapter mechanically coupling the conduit and the damper, the adapter comprising: a first mounting structure having a mounting recess to a negative defined by an outer surface of the conduit, a second mounting structure comprising an annulus configured to receive the damper, and a mounting appendage; and
a heat exchanger fluidly coupled to the conduit.

18. The gas turbine engine of claim 17, wherein the mounting appendage further comprises a third mounting structure coupled to a mounting bracket, wherein the mounting bracket is coupled to a structure of the gas turbine engine.

19. The gas turbine engine of claim 17, wherein the damper is mechanically coupled to the conduit between the oil pump and the heat exchanger by the adapter, the damper is in fluid communication with the first mounting structure and the second mounting structure is in fluid communication with the conduit, wherein the adapter further comprises a passage between the first mounting structure and the second mounting structure configured to transmit oil to the damper in response to a pulse event.

20. The gas turbine engine of claim 17, wherein the damper comprises a first threaded connection and a membrane configured to separate at least one of a gas or a compressible fluid from the oil, wherein the annulus of the adapter further comprises a second threaded connection.

\* \* \* \* \*

UNITED STATES PATENT AND TRADEMARK OFFICE
CERTIFICATE OF CORRECTION

Page 1 of 1

PATENT NO. : 9,982,601 B2
APPLICATION NO. : 14/726993
DATED : May 29, 2018
INVENTOR(S) : Eric J Helms et al.

It is certified that error appears in the above-identified patent and that said Letters Patent is hereby corrected as shown below:

In the Claims

In Column 8, Line 14 please delete "a mounting recess" and therefore insert --a mounting recess conforming--

Signed and Sealed this
Twenty-eighth Day of August, 2018

Andrei Iancu
*Director of the United States Patent and Trademark Office*